(12) United States Patent
Uhr et al.

(10) Patent No.: US 10,333,721 B2
(45) Date of Patent: Jun. 25, 2019

(54) SECURE INFORMATION TRANSMITTING SYSTEM AND METHOD FOR PERSONAL IDENTITY AUTHENTICATION

(71) Applicant: Coinplug, Inc., Seongnam-si, Gyeonggi-do (KR)

(72) Inventors: Joon Sun Uhr, Seongnam-si (KR); Jay Wu Hong, Seoul (KR); Joo Han Song, Seongnam-si (KR)

(73) Assignee: COINPLUG, INC., Korea (KR)

( * ) Notice: Subject to any disclaimer, the term of this patent is extended or adjusted under 35 U.S.C. 154(b) by 0 days.

(21) Appl. No.: 16/027,055

(22) Filed: Jul. 3, 2018

(65) Prior Publication Data

US 2018/0331837 A1 Nov. 15, 2018

Related U.S. Application Data

(63) Continuation of application No. PCT/KR2016/007468, filed on Jul. 11, 2016.

(30) Foreign Application Priority Data

Jan. 5, 2016 (KR) .......... 10-2016-0000729

(51) Int. Cl.
*H04L 12/06* (2006.01)
*H04L 12/08* (2006.01)
(Continued)

(52) U.S. Cl.
CPC .............. *H04L 12/06* (2013.01); *H04L 9/30* (2013.01); *H04L 9/32* (2013.01); *H04L 9/3226* (2013.01);
(Continued)

(58) Field of Classification Search
CPC ......... H04L 12/06; H04L 9/30; H04L 9/3226; H04L 12/04; H04L 12/08; H04L 2209/80
See application file for complete search history.

(56) References Cited

U.S. PATENT DOCUMENTS

| 2003/0055894 | A1* | 3/2003 | Yeager | G06F 9/544 709/204 |
| 2003/0056094 | A1* | 3/2003 | Huitema | H04L 63/04 713/157 |

(Continued)

FOREIGN PATENT DOCUMENTS

| KR | 10-0344114 B1 | 7/2002 |
| KR | 10-2011-0078146 A | 7/2011 |

(Continued)

OTHER PUBLICATIONS

International Search Report and Written Opinion for PCT/KR2016/007468 dated Oct. 31, 2016.

*Primary Examiner* — Yonas A Bayou
(74) *Attorney, Agent, or Firm* — Xsensus LLP (57) ABSTRACT

A secure information transmitting system and method for personal identity authentication, which, on the basis of a user public key, encrypt and transmit an authentication number transmitted from a server that provides a service to a user to a mobile communication terminal of the user, thereby preventing an unauthorized user who obtained the authentication number from being recognized even if an authentication number is externally exposed through hacking.

8 Claims, 7 Drawing Sheets

(51) Int. Cl.
   *H04L 12/04* (2006.01)
   *H04L 9/30* (2006.01)
   *H04L 9/32* (2006.01)
   *H04W 12/04* (2009.01)
   *H04W 12/06* (2009.01)
   *H04W 12/08* (2009.01)

(52) U.S. Cl.
   CPC .............. *H04L 12/04* (2013.01); *H04L 12/08* (2013.01); *H04W 12/04* (2013.01); *H04W 12/06* (2013.01); *H04W 12/08* (2013.01); *H04L 2209/80* (2013.01)

(56) References Cited

U.S. PATENT DOCUMENTS

| | | | | |
|---|---|---|---|---|
| 2006/0004789 A1* | 1/2006 | Lunt | ....................... | G06Q 30/02 |
| 2010/0093310 A1* | 4/2010 | Gbadegesin | ........ | H04L 63/0807 |
| | | | | 455/411 |
| 2010/0211795 A1* | 8/2010 | Brown | ............... | G06Q 20/0855 |
| | | | | 713/176 |
| 2011/0035677 A1* | 2/2011 | Vitale | .................... | G06Q 10/10 |
| | | | | 715/751 |
| 2011/0319058 A1* | 12/2011 | Ankolekar | .............. | H04W 4/08 |
| | | | | 455/414.1 |
| 2015/0019869 A1* | 1/2015 | Walker | .................. | H04L 9/3239 |
| | | | | 713/171 |
| 2017/0223015 A1* | 8/2017 | Lee | ....................... | H04L 9/0869 |

FOREIGN PATENT DOCUMENTS

| | | | |
|---|---|---|---|
| KR | 10-1358375 B1 | | 2/2014 |
| KR | 10-1443849 B1 | | 9/2014 |
| KR | 101443849 B1 | * | 9/2014 |
| KR | 10-1451638 B1 | | 10/2014 |
| KR | 2017015038 A | * | 2/2017 |
| KR | 2017015091 A | * | 2/2017 |
| KR | 2017030866 A | * | 3/2017 |
| KR | 2017141861 A | * | 12/2017 |

* cited by examiner

SECURE INFORMATION TRANSMITTING SYSTEM AND METHOD FOR PERSONAL IDENTITY AUTHENTICATION

CROSS-REFERENCE TO RELATED APPLICATIONS

This application is a bypass continuation of International Patent Application No. PCT/KR2016/007468, filed Jul. 11, 2016, claiming priority to Korean Patent Application No. 10-2016-0000729, filed Jan. 5, 2016, both of which are herein incorporated by reference in their entirety.

FIELD OF THE INVENTION

The present invention relates to a system for secure transmission of user-authenticating information; and more particularly, to the system of a user device requesting a service desired by a user; a mobile device of the user, if encrypted user-authenticating information is received, decrypting the encrypted user-authenticating information and outputting the user-authenticating information; and a service-providing server, if the user device requests the service, encrypting the user-authenticating information which requests authentication of the user, and transmitting the encrypted user-authenticating information to the mobile device; wherein the user device transmits to the service-providing server the user-authenticating information which is inputted by the user after the user confirms the user-authenticating information displayed on the mobile device, and wherein the service-providing server confirming the user-authenticating information, and allowing the service to be provided to the user device, and a method using the same.

BACKGROUND OF THE INVENTION

With the recent development of Internet communication technology, various functions utilizing mobile communication devices such as smart phones are being provided.

That is, as the data processing technology based on the wireless communications rapidly develops, people can use services like not only a voice communication but also a short message transmission, a video call, an electronic notebook, entertainment, Internet connection, and video message transmission.

Recently, a mobile device authentication service became popular which carries out identity authentication provided by a telecommunications company, a financial institution server, a portal site, etc. through a mobile communication network among various services utilizing a mobile device.

In the mobile device authentication service, when a user possessing a mobile device requests payment, information confirmation, registration, or information change all requiring authentication at a web site, an authentication number is transmitted to the mobile device having the pre-registered phone number of the user, and the user is authenticated by inputting the received authentication number through the web site. The mobile device authentication service is largely divided into two ways of authentication, one is possession authentication in which only the phone number is required for receiving the authentication number: the phone number is inputted, the authentication number is requested, then the authentication number is transmitted to the mobile device having the phone number, and the other is ownership authentication in which the phone number as well as an SSN is required: the phone number and the SSN are inputted, the authentication is performed using a DB of the telecommunications company by referring to the phone number and the SSN, then the authentication number is transmitted to the mobile device having the phone number.

However, the conventional mobile device authentication service has a problem because an unauthorized user can acquire the authentication number while its transmission from the server of the web site to the mobile device of the user through the mobile communication network, which may jeopardize financial services.

PRIOR ART

Cited Patent Literature

Cited Patent Literature 1: Korean Patent Registration No. 10-0344114 registered on Jun. 28, 2002

SUMMARY OF THE INVENTION

It is an object of the present invention to solve all the aforementioned problems.

It is another object of the present invention to provide a system and a method for secure transmission of user-authenticating information which prevent an unauthorized user from recognizing the authentication number using encrypted authentication number which cannot be decrypted in case the encrypted authentication number is leaked due to hacking, by transmitting the authentication number encrypted with a public key of a user from a service-providing server to a mobile device of the user.

In accordance with one aspect of the present invention, there is provided a system for secure transmission of user-authenticating information, including: a user device requesting a service desired by a user; a mobile device of the user, if encrypted user-authenticating information is received, decrypting the encrypted user-authenticating information and outputting the user-authenticating information; and a service-providing server, if the user device requests the service, encrypting the user-authenticating information which requests authentication of the user, and transmitting the encrypted user-authenticating information to the mobile device; wherein the user device transmits to the service-providing server the user-authenticating information which is inputted by the user after the user confirms the user-authenticating information displayed on the mobile device, and wherein the service-providing server confirming the user-authenticating information, and allowing the service to be provided to the user device.

The service-providing server includes its DB part having a customer information DB which stores a phone number of the mobile device; an user-authenticating information generator; an encrypting engine; and a message-sending part, wherein the mobile device includes its decrypting engine and its memory which stores a private key of the user, wherein the service-providing server instructs (i) the user-authenticating information generator to generate the user-authenticating information, (ii) the encrypting engine to acquire the encrypted user-authenticating information by encrypting the user-authenticating information with a public key of the user, and (iii) the message-sending part to transmit the encrypted user-authenticating information to the mobile device by referring to the phone number stored in the customer information DB, and wherein the mobile device instructs the decrypting engine to acquire the user-authenticating information by decrypting the encrypted user-authenticating information with the private key stored in the memory.

The customer information DB stores user identification information used for identifying the user, wherein the system further includes: a key server and blockchain nodes, wherein the key server includes (I) its DB part having a keyword DB which stores a pair of (i) the user identification information and (ii) a transaction ID for registration used as a key value for searching transaction information for registration with the public key therein, and (II) its transaction-processing engine, wherein the blockchain nodes authorize a cryptocurrency payment through verification of transaction information for cryptocurrency payment if the transaction information for the cryptocurrency payment is received, store the transaction information for the cryptocurrency payment in a blockchain by referring to a result of the authorizing process, and registers the transaction information for registration in the blockchain, wherein the service-providing server, if the service is requested by the user device, acquires and transmits the user identification information from the customer information DB to the key server, wherein the key server retrieves the transaction ID for registration from the keyword DB by referring to the transmitted user identification information, and transmits the transaction ID for registration to the blockchain nodes, wherein the blockchain nodes retrieves the transaction information for registration from the blockchain by referring to the transmitted transaction ID for registration, and transmits the transaction information for registration to the key server, and wherein the key server instructs its transaction-processing engine to acquire the public key from the transmitted transaction information for registration and to transmit the public key to the service-providing server.

The mobile device includes its key-generating engine, wherein the mobile device instructs its key-generating engine to generate the public key and the private key, to store the private key in the memory, and to transmit the public key to the service-providing server, wherein the service-providing server transmits the private key and the user identification information to the key server, wherein the key server (i) receives the private key and the user identification information from the service-providing server, (ii) instructs its transaction-processing engine to (ii-1) generate the transaction information for registration including the public key, and the transaction ID for registration used as a key value for searching the transaction information for registration, (ii-2) transmit the transaction information for registration to the blockchain nodes, and (ii-3) store the transaction ID for registration and the user identification information in the keyword DB, and wherein the blockchain nodes store the transmitted transaction information for registration in the blockchain.

In accordance with another aspect of the present invention, there is provided a method for secure transmission of user-authenticating information, including: a step S100 of a user device connecting to a service-providing server and transmitting a service request for requesting a service desired by a user; a step S110 of the service-providing server, if the user device receives the service request, determining whether the user who requested the service has provided a public key of the user before the service request; a step S120 of the service-providing server, if the user has provided the public key, instructing its user-authenticating information generator to create the user-authenticating information; a step S130 of the service-providing server instructing its encrypting engine to acquire encrypted user-authenticating information by encrypting the user-authenticating information with the public key; a step S140 of the service-providing server instructing its message-sending part to transmit the encrypted user-authenticating information to a mobile device by referring to a phone number of the user stored in a customer information DB; a step S150 of the mobile device instructing its decrypting engine to acquire the user-authenticating information by decrypting the encrypted user-authenticating information with a private key of the user stored in a memory and to output the user-authenticating information; a step S160 of the user device transmitting to the service-providing server the user-authenticating information inputted by the user after the user's confirming the user-authenticating information displayed on the mobile device, and a step S170 of the service-providing server confirming the user-authenticating information, and allowing the service to be provided to the user device.

If it is determined that the user has not provided the public key at the step of S110, the method further includes: a step S111 of the service-providing server transmitting a generation request for generating the public key and the private key to the mobile device by referring to the phone number stored in the customer information DB; a step S112 of the mobile device instructing a key-generating engine to generate the public key and the private key, to store the private key in the memory, and to transmit the public key to the service-providing server; a step S113 of the service-providing server transmitting the private key and user identification information on the user to a key server; a step S114 of the key server (i) receiving the private key and the user identification information from the service-providing server, (ii) instructing its transaction-processing engine to generate (ii-1) transaction information for registration including the public key, and (ii-2) a transaction ID for registration used as a key value for searching the transaction information for registration; a step S115 of the key server transmitting the transaction information for registration to blockchain nodes, and storing the transaction ID for registration and the user identification information in a keyword DB; and wherein the blockchain nodes storing the transmitted transaction information for registration in a blockchain.

After the step of S100, the public key is transmitted to the service-providing server by way of: a step S131 of the service-providing server, if the service is requested by the user device, acquiring and transmitting user identification information on the user who requested the service, from a customer information DB to a key server, a step S132 of the key server retrieving a transaction ID for registration from a keyword DB by referring to the transmitted user identification information, and transmitting the transaction ID for registration to blockchain nodes, a step S133 of the blockchain nodes retrieving transaction information for registration from a blockchain by referring to the transmitted transaction ID for registration, and transmitting the transaction information for registration to the key server, and a step S134 of the key server instructing its transaction-processing engine to acquire the public key from the transmitted transaction information for registration and to transmit the public key to the service-providing server.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The embodiments below of the present invention will be described in sufficient detail by referring to attached drawings regarding configurations and effects of the embodiments.

Figure 1:
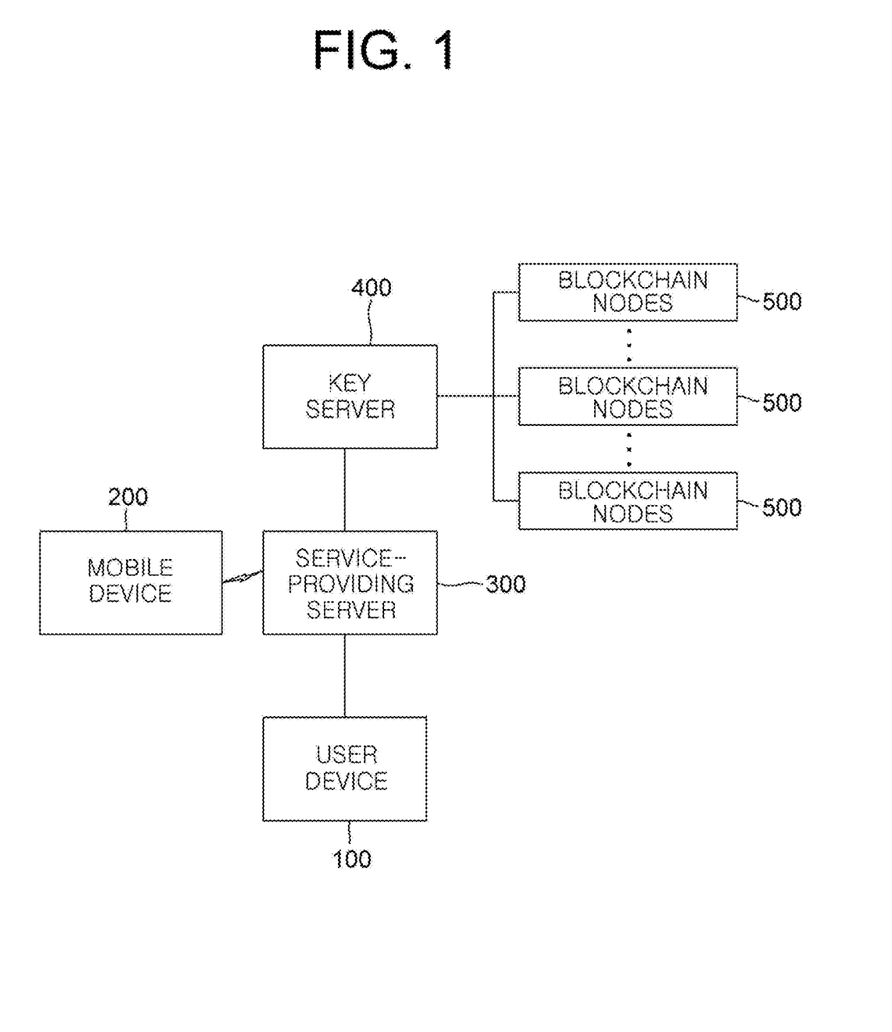
FIG. 1 is a block diagram illustrating a system for secure transmission of user-authenticating information in accordance with the present invention.

As illustrated, a system for secure transmission of user-authenticating information in accordance with the present invention may include a user device 100, a mobile device 200, a service-providing server 300, a key server 400, and blockchain nodes 500.

First, the user device 100 may be a device requesting a service, e.g., payment service, information inquiry service, purchasing service, etc. among various services delivered by the service-providing server 300, with the user device logged-in to the service-providing server 300 to be described later, and may be connected with the service-providing server 300 through a network including the Internet.

The mobile device 200 may be owned by the user, and may be a device decrypting and outputting encrypted user-authenticating information if the encrypted user-authenticating information is received from a message-sending part 340 of the service-providing server 300 to be described later, and may be connected with the service-providing server 300 through a network including telecommunications network. Herein, the network including telecommunications network may include at least one of WiFi, wireless LAN network, and WCDMA network.

Figure 2:
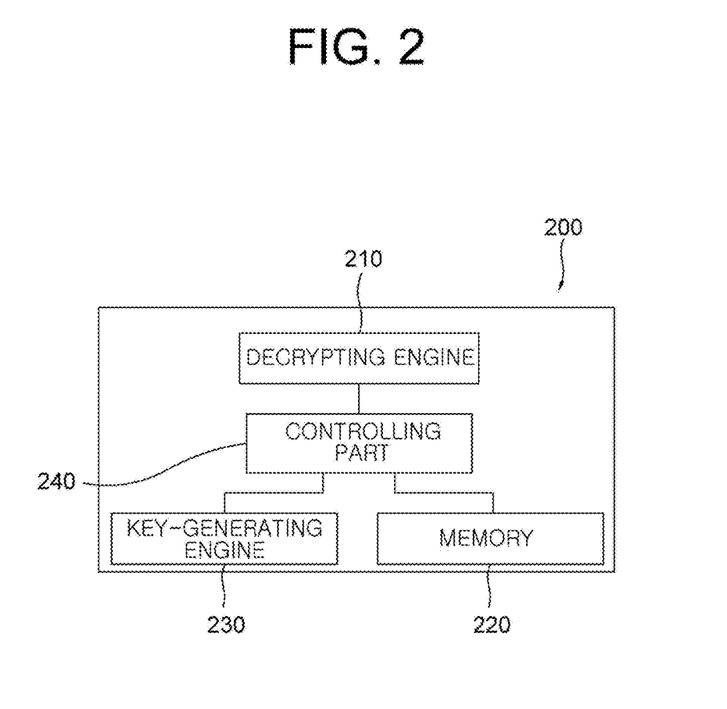
FIG. 2 is a block diagram illustrating a mobile device in a configuration of the system for secure transmission of user-authenticating information in accordance with the present invention.

The mobile device 200 performing such functions may include a key-generating engine 230 which generates a public key of the user and a private key of the user, a memory 220 which stores the private key generated at the key-generating engine 230, a decrypting engine 210, and a controlling part 240 which controls the key-generating engine 230, the memory 220, and the decrypting engine 210.

Herein, the key-generating engine 230 and the decrypting engine 210 may be installed on the mobile device 200 in a form of a mobile-exclusive app provided by the service-providing server 300 to be described later.

If the key-generating engine 230 and the decrypting engine 210 are installed on the mobile device 200, the controlling part 240 may instruct the key-generating engine 230 to generate the public key and the private key, where the controlling part 240 of the mobile device 200 may allow the public key and the private key to be generated while the network is being disconnected, to prevent possible leakage of the keys.

Thereafter, the controlling part 240 may store the private key in the memory 220, and may transmit the public key to the service-providing server 300 to be described later.

Figure 3:
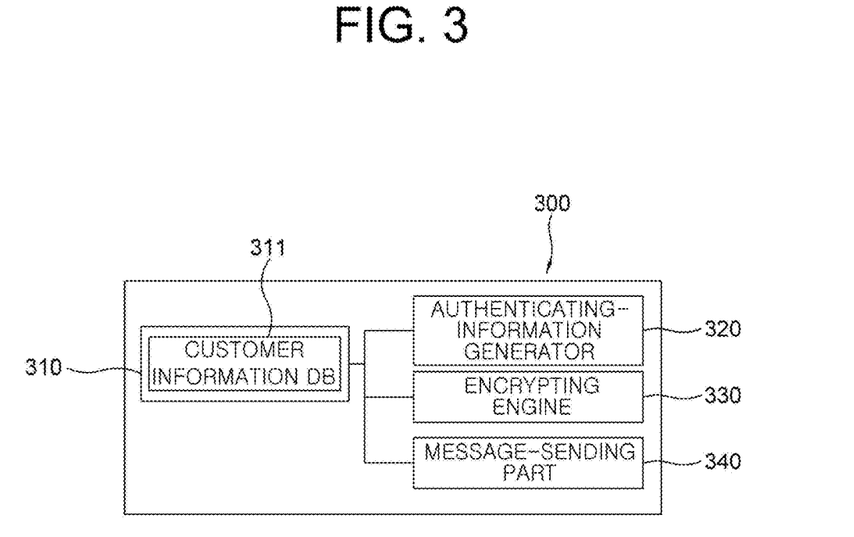
FIG. 3 is a block diagram illustrating a service-providing server in the configuration of the system for secure transmission of user-authenticating information in accordance with the present invention.

Thereafter, the service-providing server 300 may store the public key transmitted from the mobile device 200 in a customer information DB 311 of a DB part 310.

Meanwhile, when the public key is stored in the customer information DB 311, it may be leaked or forged by hacking.

To prevent this, the present invention may store the public key required for encrypting an authentication number in a blockchain, not in a private server, may provide a function of serving the public key whenever it is needed, and for this purpose, may require the key server 400 and the blockchain nodes 500.

First, if the public key is received from the mobile device 200, the service-providing server 300 to be described later may retrieve user identification information on the user from the customer information DB 311, and may transmit the retrieved user identification information and the private key to the key server 400. Herein, the received public key is not stored in the customer information DB 311.

Figure 4:
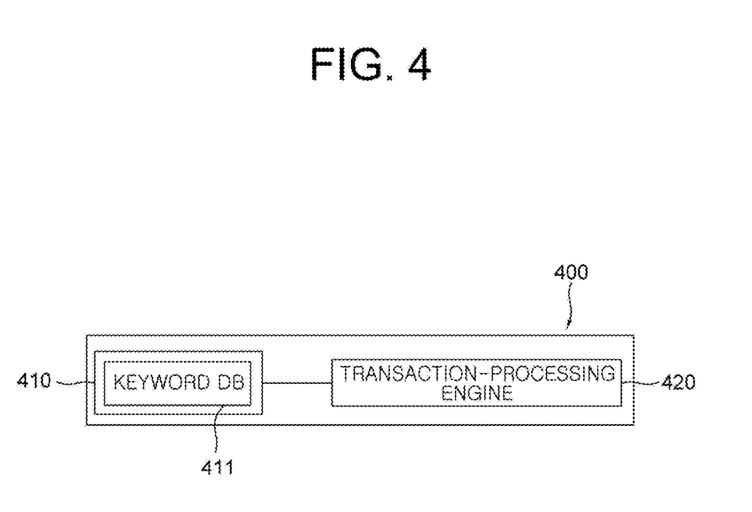
FIG. 4 is a block diagram illustrating a key server in the configuration of the system for secure transmission of user-authenticating information in accordance with the present invention.

The key server 400 may include its DB part 410 having its keyword DB 411, and its transaction-processing engine 420.

If the private key and the user identification information are received from the service-providing server 300, the key server 400 may instruct its transaction-processing engine 420 to generate (i) transaction information for registration including the received public key, and (ii) a transaction ID for registration used as a key value for searching the transaction information for registration.

Thereafter, the transaction-processing engine 420 may transmit the transaction information for registration to the blockchain nodes 500 in order to register in the blockchain, and may store the transaction ID for registration and the user identification information in the keyword DB 411.

The blockchain nodes 500 may be devices composing a cryptocurrency network that performs cryptocurrency transactions, e.g., bitcoin transactions, by verifying and recording the transactions.

Herein, the bitcoin is briefly explained. Bitcoin is a digital currency capable of payment in kind made by Satoshi Nakamoto in 2009, and has a decentralized structure which does not have a central device that issues and manages the currency. Rather, the transactions of bitcoin are processed by a blockchain network based on a peer-to-peer, i.e., P2P, network and public key encryption.

Having a payment method as such, the bitcoin has advantages that payment is possible without using information required for credit card transactions such as card numbers, expiration dates, and CCV numbers, and that fees are inexpensive. Further, bitcoin is stored in a digital wallet which is an electronic file, and a unique address, i.e., a public address, is allocated to this digital wallet, and the bitcoin transactions are processed based on the address.

In order to use bitcoin with such transactional characteristics, first of all, a bitcoin user may sign in to a bitcoin exchange, e.g., www.coinplug.com, and make a digital wallet then load it with KRW, i.e., Korean Won.

Thereafter, after confirming a current exchange rate of bitcoin at the exchange, the bitcoin user may place a buying order including an amount and a unit price of bitcoin. If a selling order matching the buying order exists, then a transaction occurs and bitcoin is purchased, and the bitcoin user may pay with bitcoin for a product.

Such the blockchain nodes 500 may include a server managed by the bitcoin exchange, and may further include a server or a terminal operated by a bitcoin miner, or a user's terminal capable of Internet communications for bitcoin payment, e.g., a PC or a smart phone.

For this purpose, the respective blockchain nodes 500 may include digital wallets, and if transaction information for bitcoin payment created by the digital wallets according to a typical bitcoin payment is received, the blockchain nodes 500 may verify the received transaction information for bitcoin payment to authorize the bitcoin payment, and then the transaction information bitcoin payment may be recorded and broadcast to the blockchain nodes 500 as designated.

That is, the broadcast of the transaction information for bitcoin payment is defined by a protocol, and if the transaction information for bitcoin payment occurs, one node of the blockchain nodes broadcasts initial transaction information for bitcoin payment to eight designated nodes, then each of the eight designated nodes that received the information broadcasts again to another eight designated nodes in a pyramidic fashion, and the broadcast is completed when the information is transmitted to all of the blockchain nodes 500 required for bitcoin payment.

Therefore, any transaction information including the aforementioned transaction information for registration of the public key as well as the transaction information for bitcoin payment cannot be tampered with, because they are stored in the blockchain comprised of more than 100,000 of the blockchain nodes 500.

Further, the blockchain of the blockchain nodes 500 may include private information as well as the transaction information for bitcoin payment, and the description is as follows, which will explain the reason that the transaction information for registration including the public key required for authentication of the user when the requested service is to be used, as the private information, can also be stored in the blockchain.

If the transaction information for bitcoin payment in which OP_RETURN information, i.e., Operation Code RETURN, is enclosed is transmitted, then each of the blockchain nodes 500 broadcasts the transaction information as private information, not as information representing a bitcoin payment, and an inclusion of the OP_RETURN information into the transaction information for registration plays a major role in encryption of information for authentication used for authentication of the user.

Herein, if the blockchain nodes 500 detect OP_RETURN information in the transaction information for bitcoin payment when authorizing the bitcoin payment, the blockchain nodes 500 may send a notification that the information with the OP_RETURN in it is used to represent an arbitrary data, not transaction information for bitcoin payment.

The service-providing server 300 may be a device that, if the user device 100 transmits a service request, encrypts the user-authenticating information which requests the authentication of the user, and transmits the encrypted user-authenticating information to the mobile device 200 of the user.

Herein, the user must be a member logged-in to the service-providing server 300 to request a service.

For this purpose, if the user connects to the service-providing server 300 by way of the user device 100 and registers personal information including a member ID and a password used when logging-in and a phone number of the mobile device 200, the service-providing server 300 may store the registered information in the customer information DB 311 to thereby allow the user to log-in to the service-providing server 300 using the member ID and the password.

In order to do so, the service-providing server 300 may include its DB part 310 having its customer information DB 311 which stores the phone number of the mobile device of the user, its user-authenticating information generator 320, its encrypting engine 330, and its message-sending part 340.

By these processes, the service-providing server 300 may instruct its user-authenticating information generator 320 to create the user-authenticating information which is a random value. Herein, the user-authenticating information includes numbers, characters, symbols, or any other combination of them.

Thereafter, the service-providing server 300 may instruct its encrypting engine 330 to acquire encrypted user-authenticating information by encrypting the user-authenticating information with the public key of the user.

Thereafter, the service-providing server 300 may instruct its message-sending part 340 to transmit the encrypted user-authenticating information to the mobile device 200 by referring to the phone number of the mobile device 200 owned or possessed by the user stored in the customer information DB 311.

Herein, if the message-sending part 340 is an SMS module, it may transmit the encrypted user-authenticating information in a form of a short message, i.e., an SMS message, and if it is a push-message module, then it may send as in a form of a push message. Herein, if the encrypted user-authenticating information is to be transmitted as a push message, the mobile device 200 must have a push application.

Meanwhile, the push application may be an application which provides a push service for sending notification or an event notice to the user, and it may include Google Android push message client, Apple IOS push message client, Kakako Talk, Skype and NateOn, etc. By these processes, the push application of the mobile device 200 may establish a TCP/IP (Transmission Control Protocol/Internet Protocol) connection with the service-providing server 300, and may receive the encrypted user-authenticating information as a push message from the service-providing server 300.

Thereafter, the mobile device 200 may instruct its decrypting engine 210 to acquire and output the user-authenticating information by decrypting the encrypted user-authenticating information with the private key stored in the memory 220, and may allow the user to confirm the outputted user-authenticating information.

If the user inputs the confirmed user-authenticating information by way of the user device 100, the user device 100 may transmit the inputted user-authenticating information to the service-providing server 300.

Thereafter, the service-providing server 300 may confirm the transmitted user-authenticating information, and may allow the requested service to be provided to the user device 100.

Herein, in one case, the service-providing server 300 may retrieve the public key from the customer information DB 311 if the public key is stored in the customer information DB 311, and in another case, may retrieve the public key whenever it is needed if the public key is stored in the blockchain to prevent its leakage or forgery by hacking via processes as follows.

That is, if the service request is received from the user device 100, the service-providing server 300 may acquire and transmit the user identification information on the user who requested the service, from the customer information DB 311 to the key server 400.

The key server 400 may retrieve the transaction ID for registration from the keyword DB 411 by referring to the transmitted user identification information, and may transmit the transaction ID for registration to the blockchain nodes 500.

Herein, the blockchain nodes 500, where the transaction ID for registration is transmitted to, may be designated in advance.

Thereafter, the blockchain nodes 500 may retrieve the transaction information for registration from the blockchain by referring to the transmitted transaction ID for registration, and may transmit the transaction information for registration to the key server 400.

The key server 400 may instruct its transaction-processing engine 420 to acquire the public key from the transmitted transaction information for registration and to transmit the public key to the service-providing server 300.

Figure 5:
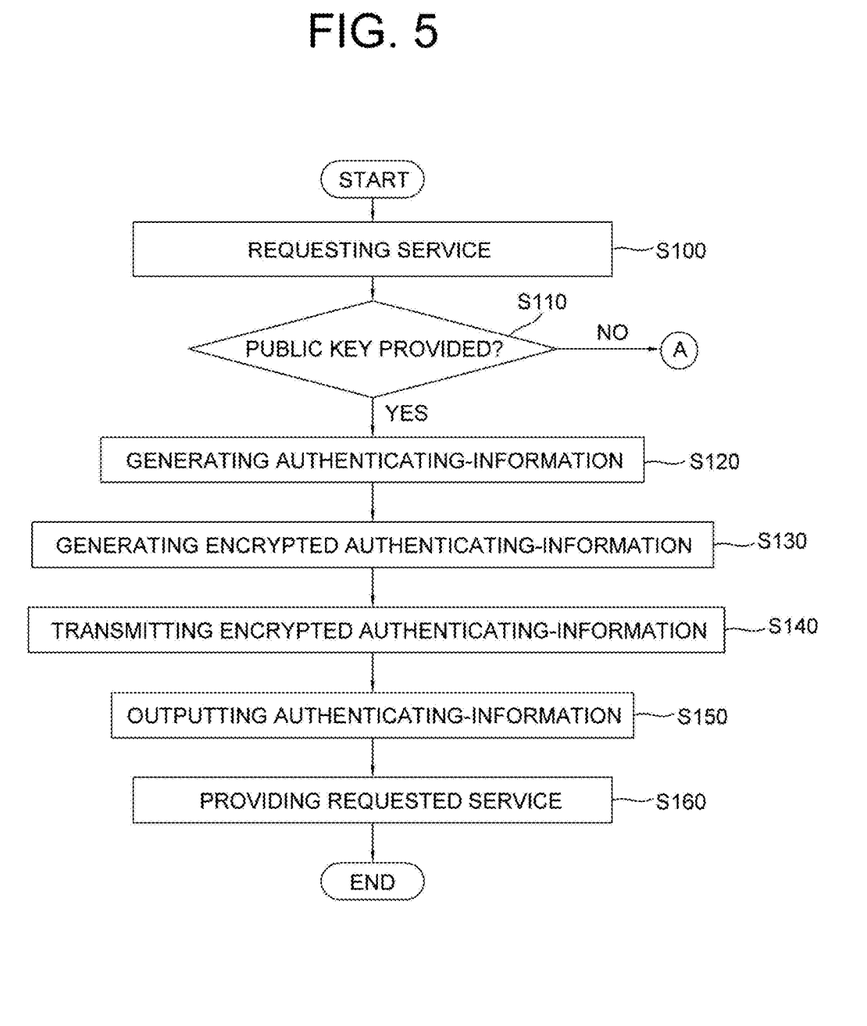
FIGS. 5 to 7 are flowcharts illustrating processes of encrypting and transmitting of the user-authenticating information in the system for secure transmission of user-authenticating information in accordance with the present invention.
Figure 6:
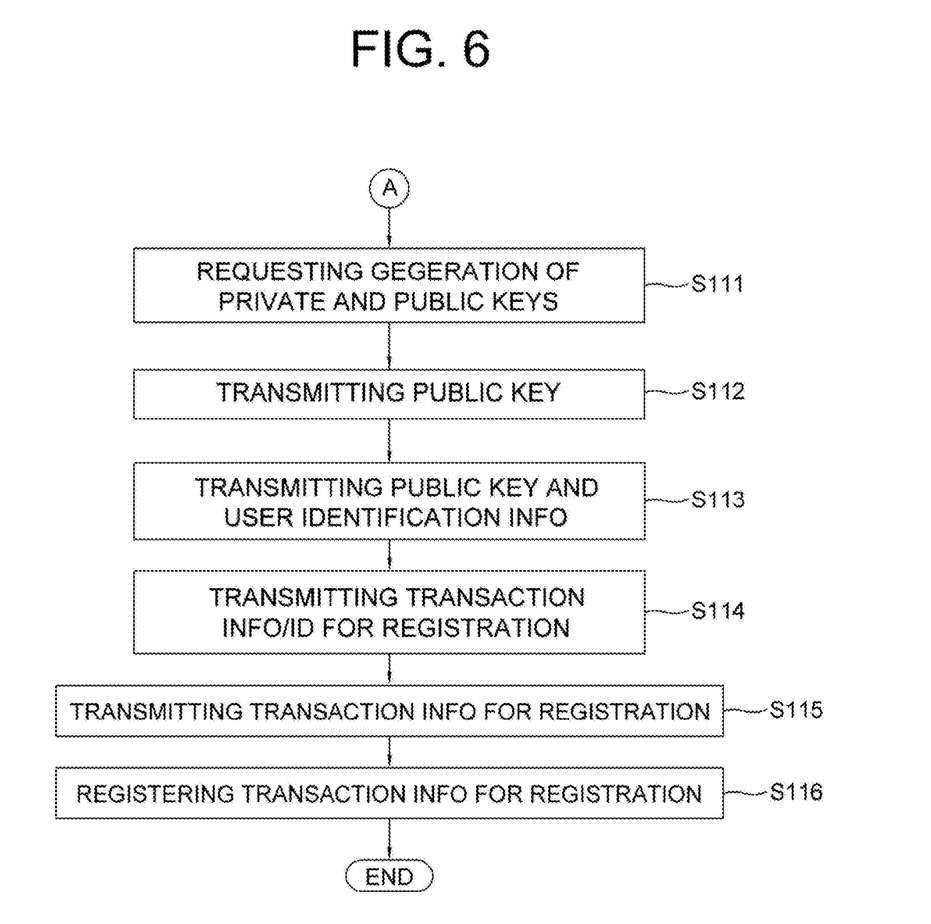
Figure 7:
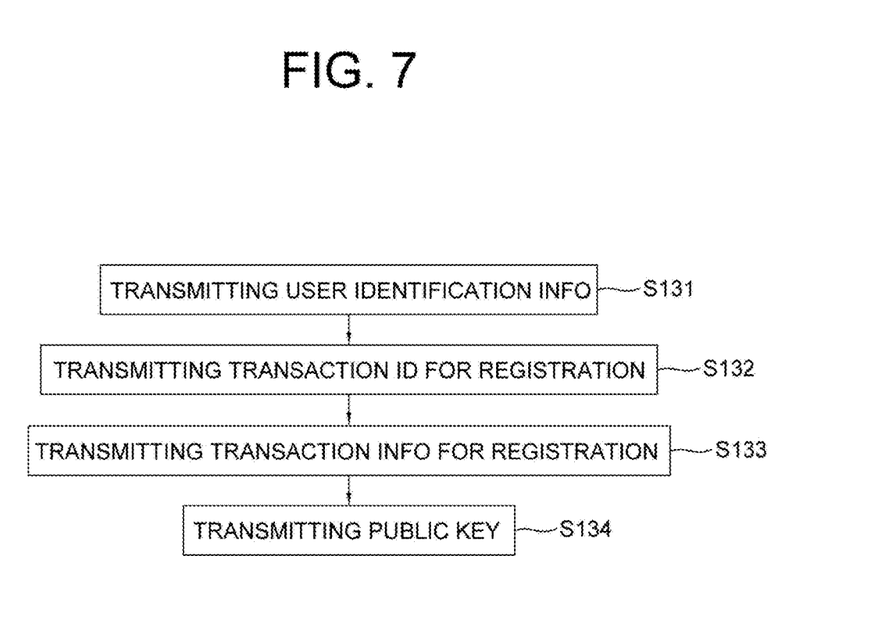

Processes of encrypting and transmitting the user-authenticating information by using the system for secure transmission of user-authenticating information configured as such are as follows.

First of all, the user may transmit the service request by connecting to the service-providing server 300 through a log-in process using the member ID and the password by way of the user device 100, at a step of S100.

Herein, if the service request is received from the user device 100, the service-providing server 300 may determine whether the user has provided the public key of the user before the service request, at a step of S110. Herein, whether the public key has been provided may be determined by confirming whether the transaction ID for registration of the public key of the user is present in the customer information DB 311.

If it is determined that the public key has not been provided in advance, the service-providing server 300 may transmit a generation request for generating the public key and the private key to the mobile device 200 by referring to the phone number stored in the customer information DB 311, at a step of S111. Herein, the service-providing server 300 may allow the mobile-exclusive app including the key-generating engine 230 and the decrypting engine 210 to be transmitted and installed on the mobile device 200, to thereby perform the generation request.

Thereafter, the mobile device 200 may instruct the key-generating engine 230 to generate the public key and the private key, to store the private key in the memory 220, and to transmit the public key to the service-providing server 300, at a step of S112.

The service-providing server 300 may transmit the private key and the user identification information on the user to the key server 400, at a step of S113.

If the private key and the user identification information are received from the service-providing server 300, the key server 400 may instruct its transaction-processing engine 420 to generate (i) the transaction information for registration including the received public key, and (ii) the transaction ID for registration used as a key value for searching the transaction information for registration, at a step of S114.

Thereafter, the key server 400 may transmit the transaction information for registration to the blockchain nodes 500 in order to register in the blockchain, and store the transaction ID for registration and the user identification information in the keyword DB 411, at a step of S115.

Thereafter, the blockchain nodes 500 may store the transmitted transaction information for registration in the blockchain, at a step of S116.

Then, if it is determined that the user has provided the public key of the user, the service-providing server 300 may instruct its user-authenticating information generator 320 to create the user-authenticating information which is a random value, at a step of S120.

Thereafter, the service-providing server 300 may instruct its encrypting engine 330 to acquire the encrypted user-authenticating information by encrypting the user-authenticating information with the public key of the user, at a step of S130.

Herein, acquisition of the public key is performed as follows.

If the service request is received from the user device 100, the service-providing server 300 may acquire and transmit the user identification information on the user who requested the service from the customer information DB 311 to the key server 400, at a step of S131.

The key server 400 may retrieve the transaction ID for registration from the keyword DB 411 by referring to the transmitted user identification information, and may transmit the transaction ID for registration to the blockchain nodes 500, at a step of S132.

The blockchain nodes 500 may retrieve the transaction information for registration from the blockchain by referring to the transmitted transaction ID for registration, and may transmit the transaction information for registration to the key server 400, at a step of S133.

The key server 400 may instruct its transaction-processing engine 420 to acquire the public key from the transmitted transaction information for registration and to transmit the public key to the service-providing server 300, at a step of S134.

Thereafter, the service-providing server 300 may instruct its message-sending part 340 to transmit the encrypted user-authenticating information to the mobile device 200 by referring to the phone number of the user stored in the customer information DB 311, at a step of S140.

If the encrypted user-authenticating information is received from the service-providing server 300, the mobile device 200 may instruct its decrypting engine 210 to acquire the user-authenticating information by decrypting the encrypted user-authenticating information with the private key of the user stored in the memory 220 and to output the user-authenticating information, at a step of S150.

If the user operates the user device 100 to confirm the user-authenticating information displayed on the mobile device 200, and to input the confirmed user-authenticating information, the user device 100 may transmit the inputted user-authenticating information to the service-providing server 300, at a step of S160.

The service-providing server 300 may confirm the transmitted user-authenticating information, and may allow the requested service to be provided to the user device 100, at a step of S170.

The present invention has an effect of preventing an unauthorized user from recognizing the authentication number using the encrypted authentication number which cannot be decrypted in case the encrypted authentication number is leaked due to hacking, by transmitting the authentication number encrypted with the public key of the user from the service-providing server to the mobile device of the user.

The present invention has another effect of preventing leakage or forgery of the public key of the user due to hacking in case the public key is maintained in a private server, by storing the public key required for encrypting the authentication number in the blockchain which is immune to forgery and falsification, not in the private server, and serving the public key only when needed.

What is claimed is:

1. A system for secure transmission of user-authenticating information, comprising: a user device requesting a service desired by a user;
   a mobile device of the user, if encrypted user-authenticating information is received, decrypting the encrypted user-authenticating information and outputting the user-authenticating information; and
   a service-providing server, if the user device requests the service, encrypting the user-authenticating information which requests authentication of the user, and transmitting the encrypted user-authenticating information to the mobile device;
   wherein the user device transmits to the service-providing server the user-authenticating information which is inputted by the user after the user confirms the user-authenticating information displayed on the mobile device, and
   wherein the service-providing server confirming the user-authenticating information, and allowing the service to be provided to the user device,
   wherein the service-providing server includes its database part having a customer information database which stores a phone number of the mobile device; an user-authenticating information generator; an encrypting engine; and a message-sending part,
   wherein the mobile device includes its decrypting engine and its memory which stores a private key of the user,
   wherein the service-providing server instructs (i) the user-authenticating information generator to generate the user-authenticating information, (ii) the encrypting engine to acquire the encrypted user-authenticating information by encrypting the user-authenticating information with a public key of the user, and (iii) the message-sending part to transmit the encrypted user-authenticating information to the mobile device by referring to the phone number stored in the customer information database, and
   wherein the mobile device instructs the decrypting engine to acquire the user-authenticating information by decrypting the encrypted user-authenticating information with the private key stored in the memory,
   wherein the customer information database stores user identification information used for identifying the user,
   wherein the system further comprises: a key server and blockchain nodes, wherein the key server includes (I) its database part having a keyword database which stores a pair of (i) the user identification information and (ii) a transaction ID for registration used as a key value for searching transaction information for registration with the public key therein, and (II) its transaction-processing engine,
   wherein the blockchain nodes authorize a cryptocurrency payment through verification of transaction information for cryptocurrency payment if the transaction information for the cryptocurrency payment is received, store the transaction information for the cryptocurrency payment in a blockchain by referring to a result of the authorizing process, and registers the transaction information for registration in the blockchain,
   wherein the service-providing server, if the service is requested by the user device, acquires and transmits the user identification information from the customer information database to the key server,
   wherein the key server retrieves the transaction ID for registration from the keyword database by referring to the transmitted user identification information, and transmits the transaction ID for registration to the blockchain nodes,
   wherein the blockchain nodes retrieves the transaction information for registration from the blockchain by referring to the transmitted transaction ID for registration, and transmits the transaction information for registration to the key server, and
   wherein the key server instructs its transaction-processing engine to acquire the public key from the transmitted transaction information for registration and to transmit the public key to the service-providing server.

2. The system of claim 1, wherein the public key is stored in the customer information database.

3. The system of claim 1, wherein the mobile device includes its key-generating engine,
   wherein the mobile device instructs its key-generating engine to generate the public key and the private key, to store the private key in the memory, and to transmit the public key to the service-providing server,
   wherein the service-providing server transmits the private key and the user identification information to the key server,
   wherein the key server (i) receives the private key and the user identification information from the service-providing server, (ii) instructs its transaction-processing engine to (ii-1) generate the transaction information for registration including the public key, and the transaction ID for registration used as a key value for searching the transaction information for registration, (ii-2) transmit the transaction information for registration to the blockchain nodes, and (ii-3) store the transaction ID for registration and the user identification information in the keyword database, and
   wherein the blockchain nodes store the transmitted transaction information for registration in the blockchain.

4. The system of claim 1, wherein the user-authenticating information includes numbers, characters, symbols, or their combination.

5. A method for secure transmission of user-authenticating information, comprising: a step S100 of a user device connecting to a service-providing server and transmitting a service request for requesting a service desired by a user;
   a step S110 of the service-providing server, if the user device receives the service request, determining whether the user who requested the service has provided a public key of the user before the service request;
   a step S120 of the service-providing server, if the user has provided the public key, instructing its user-authenticating information generator to create the user-authenticating information;
   a step S130 of the service-providing server instructing its encrypting engine to acquire encrypted user-authenticating information by encrypting the user-authenticating information with the public key;
   a step S140 of the service-providing server instructing its message-sending part to transmit the encrypted user-authenticating information to a mobile device by referring to a phone number of the user stored in a customer information database;
   a step S150 of the mobile device instructing its decrypting engine to acquire the user-authenticating information by decrypting the encrypted user-authenticating information with a private key of the user stored in a memory and to output the user-authenticating information;

a step S160 of the user device transmitting to the service-providing server the user-authenticating information inputted by the user after the user's confirming the user-authenticating information displayed on the mobile device, and a step S170 of the service-providing server confirming the user-authenticating information, and allowing the service to be provided to the user device, wherein, if it is determined that the user has not provided the public key at the step of S110, the method further comprises:

a step S111 of the service-providing server transmitting a generation request for generating the public key and the private key to the mobile device by referring to the phone number stored in the customer information database;

a step S112 of the mobile device instructing a key-generating engine to generate the public key and the private key, to store the private key in the memory, and to transmit the public key to the service-providing server;

a step S113 of the service-providing server transmitting the private key and user identification information on the user to a key server;

a step S114 of the key server (i) receiving the private key and the user identification information from the service-providing server, (ii) instructing its transaction-processing engine to generate (ii-1) transaction information for registration including the public key, and (ii-2) a transaction ID for registration used as a key value for searching the transaction information for registration;

a step S115 of the key server transmitting the transaction information for registration to blockchain nodes, and storing the transaction ID for registration and the user identification information in a keyword database; and wherein the blockchain nodes storing the transmitted transaction information for registration in a blockchain.

6. The method of claim 5, wherein, at the step of S130, the public key is stored in the customer information database.

7. The method of claim 5, wherein the user-authenticating information includes numbers, characters, symbols, or their combination.

8. A method for secure transmission of user-authenticating information, comprising: a step S100 of a user device connecting to a service-providing server and transmitting a service request for requesting a service desired by a user;

a step S110 of the service-providing server, if the user device receives the service request, determining whether the user who requested the service has provided a public key of the user before the service request;

a step S120 of the service-providing server, if the user has provided the public key, instructing its user-authenticating information generator to create the user-authenticating information;

a step S130 of the service-providing server instructing its encrypting engine to acquire encrypted user-authenticating information by encrypting the user-authenticating information with the public key;

a step S140 of the service-providing server instructing its message-sending part to transmit the encrypted user-authenticating information to a mobile device by referring to a phone number of the user stored in a customer information database;

a step S150 of the mobile device instructing its decrypting engine to acquire the user-authenticating information by decrypting the encrypted user-authenticating information with a private key of the user stored in a memory and to output the user-authenticating information;

a step S160 of the user device transmitting to the service-providing server the user-authenticating information inputted by the user after the user's confirming the user-authenticating information displayed on the mobile device, and a step S170 of the service-providing server confirming the user-authenticating information, and allowing the service to be provided to the user device, wherein, after the step of S100, the public key is transmitted to the service-providing server by way of:

a step S131 of the service-providing server, if the service is requested by the user device, acquiring and transmitting user identification information on the user who requested the service, from a customer information database to a key server, a step S132 of the key server retrieving a transaction ID for registration from a keyword database by referring to the transmitted user identification information, and transmitting the transaction ID for registration to blockchain nodes, a step S133 of the blockchain nodes retrieving transaction information for registration from a blockchain by referring to the transmitted transaction ID for registration, and transmitting the transaction information for registration to the key server, and a step S134 of the key server instructing its transaction-processing engine to acquire the public key from the transmitted transaction information for registration and to transmit the public key to the service-providing server.

* * * * *